United States Patent [19]
Nehls

[11] Patent Number: 5,399,265
[45] Date of Patent: Mar. 21, 1995

[54] FILTER SEPTUM

[75] Inventor: Barry L. Nehls, Bowling Green, Ohio

[73] Assignee: Hydroflow, Inc., Salem, N.H.

[21] Appl. No.: 146,789

[22] Filed: Nov. 2, 1993

[51] Int. Cl.$^6$ ............................................. B01D 29/00
[52] U.S. Cl. .................................... 210/490; 210/489;
        210/496; 210/499; 210/500.1; 210/506;
        427/241; 228/262.31; 29/447
[58] Field of Search ............... 210/506, 483, 488, 489,
        210/490, 496, 500.1, 499; 428/594; 29/447;
        427/241; 228/165, 262.3, 262.31

[56] References Cited

U.S. PATENT DOCUMENTS

| | | | |
|---|---|---|---|
| 3,679,062 | 7/1972 | Burkhart | 210/499 |
| 3,780,872 | 12/1973 | Pall | 210/493 |
| 3,984,044 | 10/1976 | Breton et al. | 210/498 |
| 4,169,059 | 9/1979 | Storms | 210/496 |
| 4,234,430 | 11/1980 | Peer et al. | 210/498 |
| 4,829,766 | 5/1989 | Hemkel | 60/303 |
| 5,200,072 | 4/1993 | Fresbore et al. | 210/232 |
| 5,221,469 | 6/1993 | Nehls | 210/232 |
| 5,243,632 | 9/1993 | Badin et al. | 210/451 |

OTHER PUBLICATIONS

Microscreen Filtration of Metalworking Fluids presented and published in Mar. 1993 by the Society of Manufacturing Engineers (MR93-138) Author: Barry L. Nehls and Gale V. Cross.

Primary Examiner—Robert A. Dawson
Assistant Examiner—Ana M. Fortuna
Attorney, Agent, or Firm—Gifford, Krass, Groh, Sprinkle, Patmore, Anderson & Citkowski

[57] ABSTRACT

A filter septum is constructed with a stainless steel sheet microscreen element which has uniformly distributed apertures through which a liquid to be filtered is passed from an inlet side to an exit side of the element. The apertures are preferably tapered from a larger diameter at the inlet side to a smaller diameter at the exit side of the microscreen element. A supporting metal base plate having rows of uniformly distributed holes which are larger then the apertures is brazed to the microscreen element bonding the exit side of the microscreen element to the inlet side of the base plate. Preferably the inlet side of the microscreen element is Teflon® coated.

20 Claims, 2 Drawing Sheets

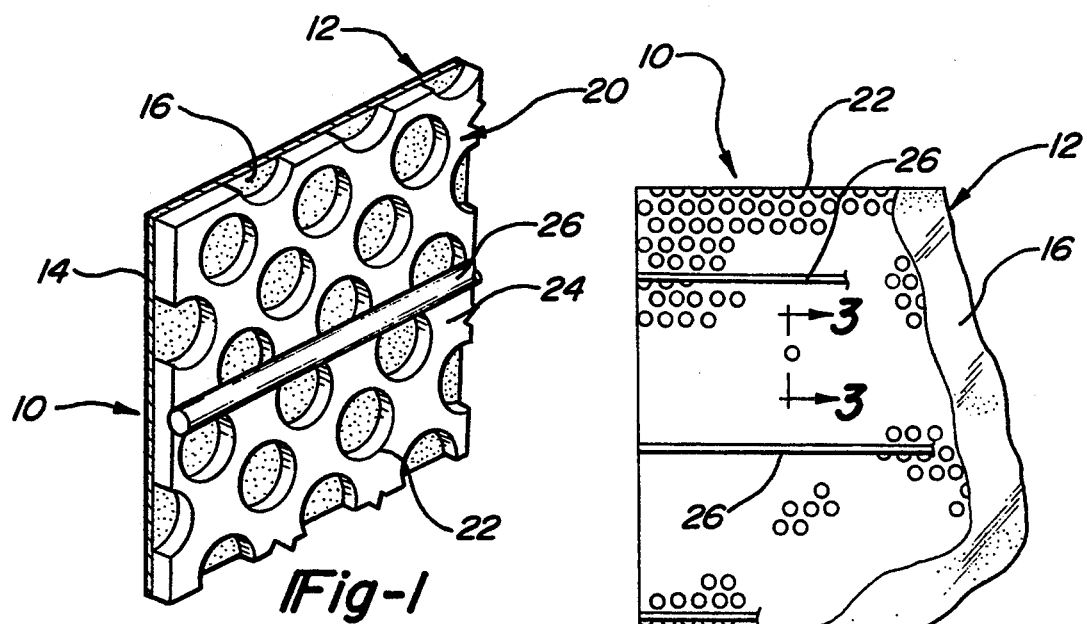
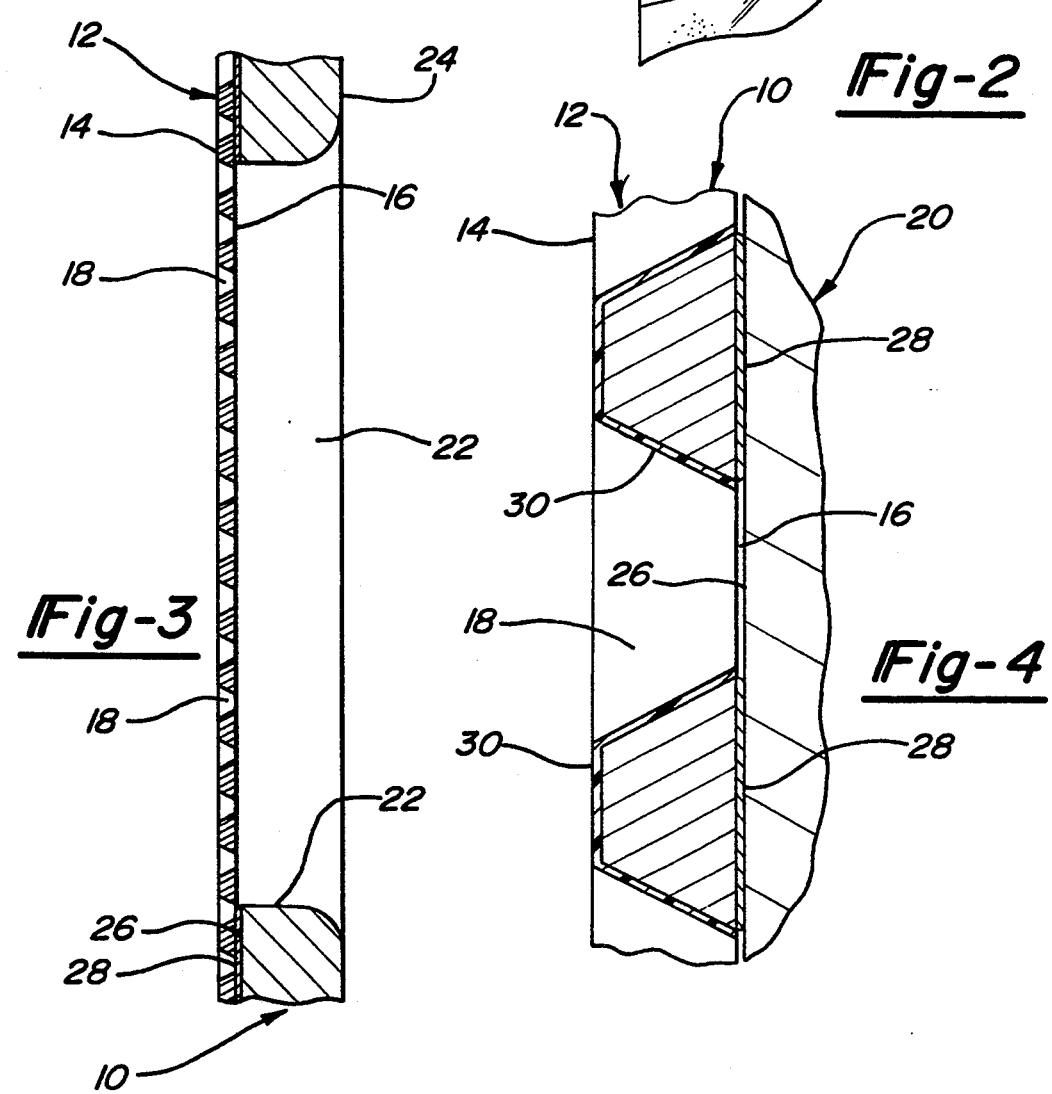

FILTER SEPTUM

BACKGROUND OF THE INVENTION

1. Field of the Invention

This invention relates to filtration systems. More particularly, this invention relates to a filter septum through which liquid to be filtered is passed and the method of manufacturing this filter septum.

2. State of the Art

The state of the prior art is accurately set forth in detail in a technical paper, of which I am a coauthor, entitled "MICROSCREEN FILTRATION OF METALWORKING FLUIDS" presented and published in March 1993 by the Society of Manufacturing Engineers. In this paper the term "microscreen" is defined as a thin metallic sheet with small, uniform apertures or holes throughout. This definition eliminates screens constructed of wire, plastic or synthetic fiber. The advantages of microscreen septums are also presented, centering around higher flux rates made possible by the ability to make the septum aperture smaller, more closely spaced, and more accurately defined by utilizing an electrochemical process in the manufacture of the microscreen. This microscreen is an essential part of the present invention.

As also presented in the above-mentioned paper, the difficulty utilizing the advantages of microscreen lies in the fabrication of the filter septum utilizing microscreen. Before the present invention, the most successful use of microscreen has been in placing the microscreen over the outside of a drum of perforated plate by wrapping and clamping the microscreen in position. The difficulties encountered in using only mechanical clamping to secure the microscreen to a perforated substrate or base plate are obvious even in the more successful use in drums and cylinders where often doctor blades are used for scraping and cleaning or pressure swings are used for backflow regeneration. With planar septum configurations the problems can be exasperated.

SUMMARY OF THE INVENTION

The referred to technical paper then presents an improvement to the mechanical clamping fabrication in the form of brazing or "fuse bonding" the microscreen to the base plate support. This innovative bonding fabrication like the electrochemical production of the microscreen is also an essential part of the present invention.

The present invention is thus directed to a filter septum fabrication in which a microscreen element is bonded to supporting base plate.

The filter septum of the invention comprises a metal sheet microscreen element having uniformly distributed apertures through which a liquid to be filtered is passed from an inlet side to an exit side of the element. The apertures are formed in the element by an electochemical process preferably providing a taper in the aperture from a larger diameter at the inlet side to a smaller diameter at the exit side. A metal base plate having rows of uniformly distributed holes which are larger than the apertures is permanently bonded to the microscreen element with a layer of brazing alloy between an inlet side of the base plate and the exit side of the microscreen element.

In the preferred form of the invention, the inlet side of the microscreen element has a non-stick plastic coating.

In other preferred forms of the invention parallel support rods are welded to the exit side of the base plate between selected adjacent rows of the holes and the microscreen sheet and the metal base plate are made with stainless steel, preferably a 316 or 304 stainless steel.

The method of producing the filter septum involves the use of an electrochemical process, preferably a photoetching process, to produce the small uniformly distributed apertures in the microscreen element. In a brazing step, an inlet side of the base plate is bonded to the exit side of the microscreen element. If the final form of the filter septum is to be non-planar, for example a cylindrical drum, the base plate will be normally preformed to its final shape prior to brazing.

Preferably, the final step of the process is plastic coating the inlet side of the microscreen element, preferably with Teflon ®.

BRIEF DESCRIPTION OF THE DRAWINGS

The advantages of the present invention will be more apparent from the following detailed description when considered in connection with the accompanying drawing wherein:

FIG. 1 is a perspective view of the filter septum of this invention;

FIG. 2 is a plan view of the filter septum showing the exit side of the base plate with its spaced reinforcing rods between adjacent rows of base plate holes, and the base plate is broken away to show the underlying microscreen element;

FIG. 3 is an enlarged sectional view taken along line 3—3 of FIG. 2 showing the tapered apertures in the microscreen element and the bonding of the microscreen element to the base plate adjacent one of the base plate holes;

FIG. 4 is an enlarged sectional view showing one of the microscreen element apertures and the bonding of the microscreen element to the base plate.

DETAILED DESCRIPTION OF THE PREFERRED EMBODIMENTS OF THE INVENTION

Figure 5:
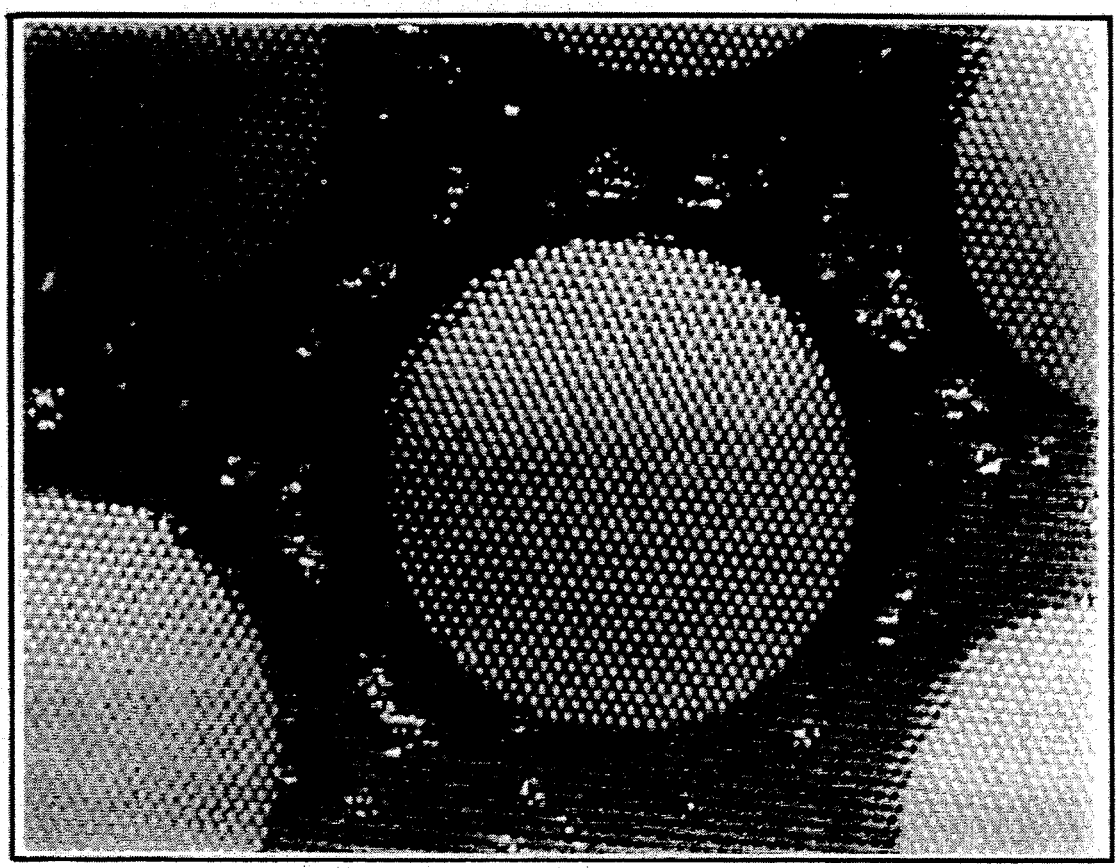
FIG. 5 is an enlarged photomicrograph of the filter septum of this invention.

The filter septum of the present invention can be sized for application to a variety of filtration septums. For example, the star shaped filter 12 described in my U.S. Pat. No. 5,221,469 uses a number of panel compartments 40 preferable arranged as shown in diametrically opposed pairs. Referring to FIGS. 5-8 of this patent, each of the compartments has a pair of opposed septums 86 which are typically made of suitable metal or plastic screen material, and in the embodiments shown they are made of stainless steel wedgewire. While the use of microscreen in a filter system was clearly contemplated, the microscreen septum of the present invention had not yet been evolved. As will be apparent, there are many advantages of the present microscreen septum over the wedgewire septum, not the least of which is the smaller microscreen aperture over the wedgewire slots which will pass particles of considerable length.

In manufacture of the microscreen element, the desired aperture pattern is first produced through CAD design and transferred to a glass plate photo master.

The pattern is then transferred in the form of a photosensitive resist to a stainless steel sheet. The photoetching process is completed by chemically machining or dissolving the apertures. Preferably the etching is conducted from both sides of the sheet at different rates to produce a tapered aperture. With the larger diameter at the inlet side and the smaller diameter at the exit side of the microscreen element, filter regeneration by a backwash process is greatly assisted to accomplish screen cleaning and filter cake release at the inlet side.

The stainless steel microscreen sheet can have a thickness between 0.003" and 0.015" and will have a closely spaced aperture pattern with the aperture diameter being between 0.003" and 0.015" but never less than the sheet thickness. The actual microscreen element in the photograph of the filter septum in FIG. 5 has a thickness of 0.005" with a hole diameter of 0.006".

As seen in FIGS. 1-4 the microscreen element 12 has an inlet side 14 and an exit side 16 with apertures 18 tapering from a larger diameter at the inlet side to a smaller diameter at the exit side. With a nominal aperture size of 0.006" diameter as shown in FIG. 5, the inlet side diameter can be approximately 0.009" with the exit side being approximately 0.006".

The supporting substrate or base plate 20 of the filter septum 10 will be substantially thicker than the microscreen sheet. In septum of FIG. 5 the base plate 20 is 11 gage stainless steel with $\frac{3}{8}$" diameter holes 22 on $\frac{1}{2}$" centers, punched from exit side 24. Reinforcing support rods 26 are welded between adjacent rows of holes 22 on the exit side, and in the example of FIG. 5, the support rods 26 have a $\frac{1}{8}$" diameter and are on 4" centers. If the final form of the filter septum is to be non-planar, for example a cylindircal drum, the base plate will be normally preformed to its final shape before brazing.

The filter septum 12 is assembled to the base plate 20 by first spot welding the exit side 16 of the microscreen element 12 to the inlet side 26 of base plate 20 as can be seen in photograph FIG. 5. This is conveniently performed by laser or resistance welding.

Final assembly of the microscreen element 12 to the base plate 20 is accomplished by furnace brazing so that all of the contact area has a layer of brazing alloy 28 between the exit side 16 of the microscreen element and the inlet side 26 of the base plate. In a preferred embodiment a nickel powder alloy is applied to the inlet side of microscreen element and fixed with an acrylic varnish carrier. The assembled microscreen element and base panel is loaded horizontally into a vacuum furnace and the temperature is ramped up to melt and wet the metal surface causing the brazing alloy to flow between the exit side of the microscreen element and the inlet side of the base plate permanently bonding the two together.

Finally a thin plastic coating 30 is applied to the inlet side of 14 of the microscreen element to assist in filter cake release and prevent clogging. In a preferred embodiment the coating is Teflon ®, fluorinated ethylene propylene, and a single coating of Dupont 958-203 Teflon is sprayed on the surface and baked to assist the air cure.

I claim:

1. A filter septum comprising:
    a metal sheet microscreen element having uniformly distributed apertures through which a liquid to be filtered is passed from an inlet side to an exit side of said element, said apertures having a taper from a larger diameter at said inlet side to a smaller diameter at said exit side of the microscreen element, said apertures having been former by an electrochemical process;
    a metal base plate having an inlet and an exit side and rows of uniformly distributed holes larger than said apertures; and
    a layer of brazing alloy between said base plate and said microscreen element bonding the exit side of the microscreen element to the inlet side of said base plate.

2. The filter septum according to claim 1 including spaced parallel support rods welded to the exit side of said base plate between selected adjacent rows of said holes.

3. The filter septum according to claim 1 wherein said metal sheet and said metal base plate are made with a stainless steel.

4. The filter septum according to claim 3 wherein said brazing alloy is a high nickel alloy.

5. The filter septum according to claim 1 including a plastic coating on said inlet side of said microscreen element.

6. The filter septum according to claim 5 wherein said coating is fluorinated ethylene propylene.

7. A filter septum comprising:
    a stainless steel sheet microscreen element having a thickness of 0.003" and 0.015" and containing uniformly distributed apertures having a diameter between 0.003" and 0.015" but not less than the thickness of the sheet;
    a stainless steel base plate having a thickness of at least 8 times the thickness of said microscreen element and having rows of uniformly distributed holes with a diameter of at least 10 times the diameter of said apertures;
    a layer of brazing alloy between said base plate and said microscreen element bonding an exit side of said microscreen element to an inlet side of said base plate; and
    a plastic coating on an inlet side of said microscreen element.

8. The filter septum according to claim 7 wherein said coating is a fluorinated ethylene propylene.

9. The filter septum according to claim 7 including spaced parallel support rods welded to an exit side of said base plate between selected spaced adjacent rows of said holes.

10. A method of producing a filter septum comprising the following steps:
    A. forming a microscreen element by using an electrochemical process to produce uniformly distributed apertures in a metal sheet, said apertures having a taper from a larger diameter at an inlet side of said element to a smaller diameter at an outlet side of said element;
    B. producing a perforated metal base plate having uniformly distributed holes larger than the apertures in the microscreen element; and
    C. brazing the microscreen element to the base plate thereby bonding the exit side of the microscreen element to an inlet side of the base plate.

11. The method according to claim 10 further including the step of plastic coating the inlet side of the microscreen element.

12. The method according to claim 11 wherein the plastic coating is selected to be a fluorinated ethylene propylene.

13. The method according to claim 10 including reinforcing the metal base plate in step B by welding support rods to an exit side of the base plate between adjacent rows of holes at spaced intervals.

14. The method according to claim 10 wherein the metal sheet in step A and the metal base plate in step B are selected to be stainless steel.

15. The method according to claim 10 wherein the metal sheet of step A is selected to have a thickness between 0.003" and 0.015" and the nominal diameter of the apertures are selected to be between 0.003" and 0.015", but not less than the thickness of the sheet.

16. The method according to claim 15 wherein the metal base plate is selected to have a nominal 11 gage thickness and the holes have a diameter of approximately ⅜" on approximately ½" staggered centers.

17. The method according to claim 10 wherein in step A the exit side of the microscreen element is welded to the inlet side of the base plate at a plurality of points; a powdered nickel alloy brazing material is applied to the inlet side of the microscreen element and the brazing is accomplished in a controlled atmosphere furnace.

18. The method according to claim 17 wherein the brazing is accomplished in a vacuum furnace while the microscreen element and base plate are held in a horizontal position and the temperature is increased allowing the powdered brazing material to melt and wet the metal surfaces bonding the exit side of the microscreen element to the inlet side of the base plate throughout their contacting surfaces.

19. A method of producing a filter septum comprising the following steps:
  A. forming a microscreen element by using a photo etching process to produce uniformly distributed apertures in a stainless steel sheet;
  B. providing a perforated stainless steel base plate having uniformly distributed holes larger than the apertures in the microscreen;
  C. brazing the microscreen element to the base plate thereby bonding an exit side of the microscreen element to an inlet side of the base plate; and
  D. coating an inlet side of the microscreen element with a fluorinated ethylene propylene.

20. The method according to claim 19 including reinforcing the metal base plate in step B by welding support rods to an exit side of the base plate between adjacent rows of holes at spaced intervals.

* * * * *